(12) United States Patent
Bryant

(10) Patent No.: US 8,774,060 B2
(45) Date of Patent: Jul. 8, 2014

(54) WIRELESS HEADSET COMMUNICATION SYSTEM

(76) Inventor: Joshua R. Bryant, Bridgeville, PA (US)

(*) Notice: Subject to any disclaimer, the term of this patent is extended or adjusted under 35 U.S.C. 154(b) by 423 days.

(21) Appl. No.: 12/765,297

(22) Filed: Apr. 22, 2010

(65) Prior Publication Data

US 2010/0271983 A1 Oct. 28, 2010

Related U.S. Application Data

(60) Provisional application No. 61/171,503, filed on Apr. 22, 2009.

(51) Int. Cl.
*H04L 12/16* (2006.01)
*H04B 7/14* (2006.01)

(52) U.S. Cl.
USPC .................... 370/260; 370/401; 455/416

(58) Field of Classification Search
None
See application file for complete search history.

(56) References Cited

U.S. PATENT DOCUMENTS

| | | | |
|---|---|---|---|
| 6,608,820 B1 * | 8/2003 | Bradshaw, Jr. | 370/260 |
| 6,724,736 B1 * | 4/2004 | Azriel | 370/286 |
| 6,801,611 B2 | 10/2004 | Guccione et al. | |
| 7,187,670 B2 | 3/2007 | Hein-Magnussen et al. | |
| 7,289,825 B2 | 10/2007 | Fors et al. | |
| 2001/0041594 A1 * | 11/2001 | Arazi et al. | 455/561 |
| 2002/0143368 A1 * | 10/2002 | Cheung et al. | 370/401 |
| 2004/0192227 A1 * | 9/2004 | Beach et al. | 455/7 |
| 2005/0078624 A1 * | 4/2005 | Shu et al. | 370/328 |
| 2005/0113021 A1 * | 5/2005 | Gosieski et al. | 455/3.06 |
| 2006/0098598 A1 * | 5/2006 | Gallagher | 370/331 |
| 2006/0098606 A1 * | 5/2006 | Pandey et al. | 370/338 |
| 2006/0172727 A1 * | 8/2006 | Lee | 455/416 |
| 2006/0193269 A1 * | 8/2006 | Perraud et al. | 370/278 |
| 2007/0091830 A1 * | 4/2007 | Coulas et al. | 370/260 |
| 2007/0143105 A1 * | 6/2007 | Braho et al. | 704/231 |
| 2007/0165875 A1 * | 7/2007 | Rezvani et al. | 381/74 |
| 2008/0200159 A1 * | 8/2008 | Lai | 455/416 |
| 2010/0151788 A1 * | 6/2010 | Rahman et al. | 455/41.2 |
| 2010/0271983 A1 * | 10/2010 | Bryant | 370/277 |

* cited by examiner

*Primary Examiner* — Gregory Sefcheck
*Assistant Examiner* — Joshua Smith
(74) *Attorney, Agent, or Firm* — David G. Oberdick; Peter J. Borghetti

(57) ABSTRACT

A communication system that includes one or more mobile wireless headsets with full duplex capabilities, a server, and a communication access point configured to deliver communications between the server and the mobile wireless headsets. The communication access point can be a multi-cell network of multiple communication access points.

22 Claims, 2 Drawing Sheets

WIRELESS HEADSET COMMUNICATION SYSTEM

CROSS REFERENCE TO RELATED APPLICATIONS

The present invention claims benefit of U.S. Provisional Application Ser. No. 61/171,503, entitled "VOICE AND DATA ACCESS POINT FOR MOBILE GROUP COMPUTING" filed on Apr. 22, 2009, which is incorporated herein by reference.

FIELD OF THE INVENTION

This invention relates generally to a wireless and IP-based communication system for secure and reliable delivery of voice and/or data communications.

BACKGROUND OF THE INVENTION

The present invention is a unique wireless headset communication system which facilitates wireless voice communication among mobile users. The present invention is applicable in many fields, including, but not limited to, military, retail, mission critical, security, restaurant, construction, travel, warehouse management and other industries.

In a retail environment, for example, many clothing and product retailers currently outfit their associates with 2-way radios connected to wired headsets, for group communication. The drawback to such a system is that the radios are often bulky and cumbersome and do not interface with telephone systems. Furthermore, present walkie-talkie systems do not allow for individual communication between selected users in the group. Walkie-talkies are half-duplex, wherein the user cannot speak and listen simultaneously. Some retailers use a wired headset connected to the walkie-talkie, which presents safety issues if the wire becomes entangled.

In order to solve the above-identified problems, the present invention, in one embodiment, provides a long-range wireless headset worn on the associate's ear, thereby eliminating the need for the cumbersome 2-way radio. All wireless headsets connect to a stand-alone mobile or stationary communication access point or network of access points to provide two way voice communications or voice conference communication among three or more headsets. The present invention also allows associates to receive and initiate telephone calls while the headset user is mobile. Calls can be received from a wide range of locations including but not limited to: stationary phones within the store, corporate headquarters, or directly from customers. Calls can be initiated by the mobile headset user through voice commands. Calls can alternatively be initiated by a push button, where the mobile headset user pushes a button located on the mobile headset. The present invention further supports wireless headset communication in a multi-cell environment, enabling the headset user to roam a large area by automatically transferring the user's headset between multiple access points or repeaters with no break in wireless service. In addition to voice communication capabilities, the present invention allows associates to interface with computer systems to receive data in the form of voice messages. For example, such data in the form of voice messages could encompass inventory volume, work instructions or automated voice messages.

In the prior art, U.S. Pat. No. 7,187,670 discloses an electronic portable communications terminal for internet/network telephony. The portable terminal establishes a wireless connection with a server, wherein the server then establishes a TCP/IP connection, allowing for the placing or receiving of telephone calls. Essentially, the '670 patent consists of a portable headset which is able to make and receive wireless telephone calls through a TCP/IP connection. However, the '670 patent is focused on individual connections to the wired network, and does not contemplate voice conferencing or individual calling between multiple headset users directly through the access point. The '670 patent does not disclose or provide for roaming of a wireless headset between a multi-cell network of access points.

U.S. Pat. No. 6,801,611 discloses a conference call communication system wherein a call pod interfaces with multiple wireless telephone headsets, and connects to the headset interface of a wireless telephone. The '611 patent is focused on headset conferencing calling for a wireless telephone; it does not disclose or suggest, though, a (stand alone) access point for group headset communication, roaming between access points or a connection of the access point to a wired IP network. The '611 patent also does not provide calling or voice messaging to individual headset users.

Similarly, U.S. Pat. No. 7,289,825 discloses a wireless communication system for facilitating clinical workflow wherein a wireless communication device transmits voice or data communications to a remote system located in a health-care facility, through the use of an interface, in which the remote system either executes an operation, stores data, or retrieves data. The '825 patent does not provide, however, for the use of multiple headsets connected to one base communication access point, nor does it provide for a wireless headset communication system wherein the wireless headsets may communicate with other wireless headsets, connected to the communication access point, in the form of either two way voice communications or conference voice communication between three or more headsets. Additionally, the '825 patent discloses a communication system that is limited only to clinical workflow in a health-care facility.

The present invention improves on the prior art by providing a wireless headset communication system comprising a single communication access point (or multi-cell network of access points) and a plurality of wireless headsets for voice conferencing, individual calling, voice messaging, and other voice communications between mobile users, telephone networks and computer systems. The present invention also discloses a wireless headset communication system wherein a plurality of wireless headsets that may be connected, through the use of a stand-alone access points, to a server.

SUMMARY OF THE INVENTION

This present disclosure provides a communication access point, which connects to two or more wireless headsets for the purpose of voice or data communication. The communication access point supports voice conferencing between three or more connected wireless headsets, as well as one on one communication between two specific users. In one embodiment, the communication access point may be a standalone device which is not connected to any network. In another embodiment, multiple communication access points are connected to a wired IP network and seamlessly transition the mobile headset user between stations as the user moves across physical space. The communication access points are optionally connected to a data network, allowing the headset users to engage in IP telephony, or interface with computer and information systems through voice recognition and speech synthesis. The headsets in the present disclosure are charged through a single or multi-device charger, and contain a visual in-use indicator to show others that the headset user is presently communicating. This disclosure also provides an audio indicator for the headset user to realize he is transmitting voice by echoing the users own voice back into his headset.

DETAILED DESCRIPTION OF THE INVENTION

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated apparatus, and such further applications of the principles of the invention illustrated herein, as would normally occur to persons skilled in the art to which the invention relates. The wireless headsets in the preferred embodiment are based on the DECT standard. Other wireless headset technologies are possible, including Bluetooth, Wi-Fi or a future wireless protocol for headset communications.

Figure 1:
FIG. 1 is a schematic of the wireless headset communication system according to one embodiment of the present invention.

Referring now to FIG. 1, one embodiment of the presently disclosed communications system is shown including a communication access point 2 configured to communicate with a plurality of mobile wireless headsets 1. All headsets 1 connect to the communication access point 2. The communication access point 2 facilitates group conferencing between all headsets 1 wherein all headset users can speak and listen to the entire group of connected headset users in full duplex conversation. The headsets 1 feature push-to-talk, talk lock or VOX communication settings allowing the user to choose their preferred method of interaction. The communication access point 2 also facilitates private calling between specific users through voice commands. For instance, headset user #1 may want to contact only headset user #4 rather than the entire group. He can contact a specific headset user by speaking a voice command such as "Call headset number 4". This will initiate a secure private conversation between the two headset users. After the conversation is complete, the two users can return to group conferencing mode.

The communication system in figure one has multiple indicators to show active voice transmission. When the user is actively speaking, either through push-to-talk, talk-lock or VOX mode, a solid light will remain engage on the headset. When user finishes speaking, the light will go off to indicate the user is no longer speaking. This system is helpful for store customers or colleagues to realize when a headset user is in conversation and transmitting voice. When the headset user is listening, there will be no light or a sporadically blinking light, indicating the headset user is in listening mode rather than speaking. In order for the headset user to remember that he is actively transmitting voice, one embodiment of the system provides for an echo of the users voice back into his headset. In this way, the headset user will hear his own voice speaking and realize that he is actively transmitting voice to other headset users. Without such an indicator, a headset user might forget to turn off voice transmission and be speaking indefinitely to a group of disinterested listeners.

Figure 2:
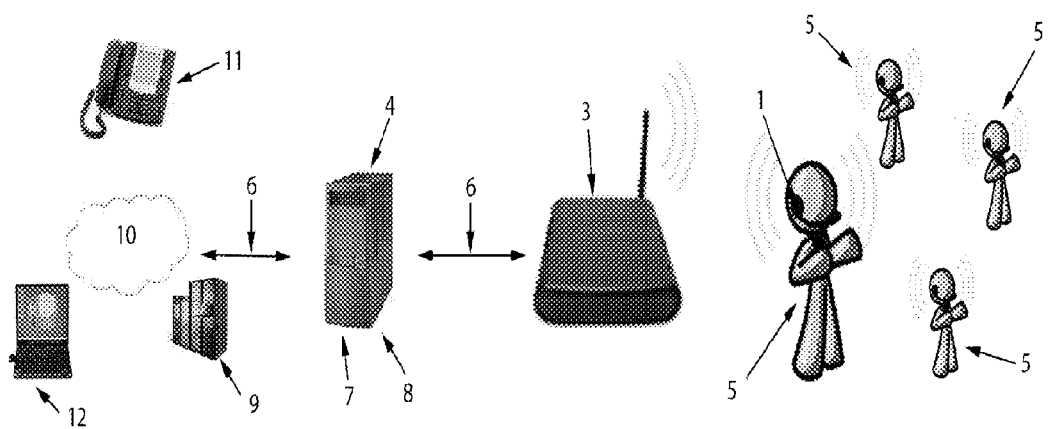
FIG. 2 is a schematic of the communication access point showing, as an example, 4 users connected to the system.

Regarding FIG. 2, the communication access point 3 is shown connected to a server 4 via Ethernet 6. The server 4 may be a stand-alone device or encompassed within the communication access point 3. In preferred embodiments, the server 4 is connected, via Ethernet 6, to a computer network 10 which may include at least on Voice-Over-Internet-Protocol (VOIP) phone 11. Alternatively, software telephones, or "softphones" 12 may be used in place of VOIP phones 11. This embodiment provides for targeted calling between the VOIP phones 11 and any specific headset user 5. This is helpful for calling a store or warehouse manager directly from any location in the world. The headset 1 becomes an endpoint similar to a mobile phone. Additionally, in this embodiment, the headset user 5 remains in group conferencing mode until he is called, wherein he answers the call for a secure and private telephone conversation with the other party. The headset user 5 may also initiate a secure and private call to any other location with voice commands such as "Call store #14" or "Call regional manager".

The embodiment as described in FIG. 2 enables a headset user 5 to receive work instructions. These work instructions may be initiated by a server 4, a remote computer system 9, or the instruction may be initiated by another person such as a customer or fellow employee. For instance, a customer may press a button in the store to send the work instruction "Customer assistance is required". This instruction can be sent to the entire group of headsets users, a subset of users, or an individual user. The headset user 5 may also receive work instructions from an automated computer system such as inventory or picking system. In this embodiment, the user may interact with the server 4, or remote computer system 9, through a combination of button clicks and voice commands, all from the wireless headset 1.

The communication access point 3 may also interface with other mobile devices, including mobile phones and 2-way radios, allowing these mobile devices to communicate with headset users 5 and vice-versa. Thus 2-way radios can be included in the group conferencing. The server 4, in preferred embodiments, may include speech recognition 7 and or text-to-speech software 8. Utilizing the capabilities of text-to-speech software 8 will allow a user to send data through the computer network 10, and have it delivered through the mobile wireless headsets 1 as voice commands. Similarly, through the use of speech recognition 7, a user may speak through the mobile wireless headset 1, allowing the speech to be translated into data and recorded on the server, without the need for a user to manually input the data.

Figure 3:
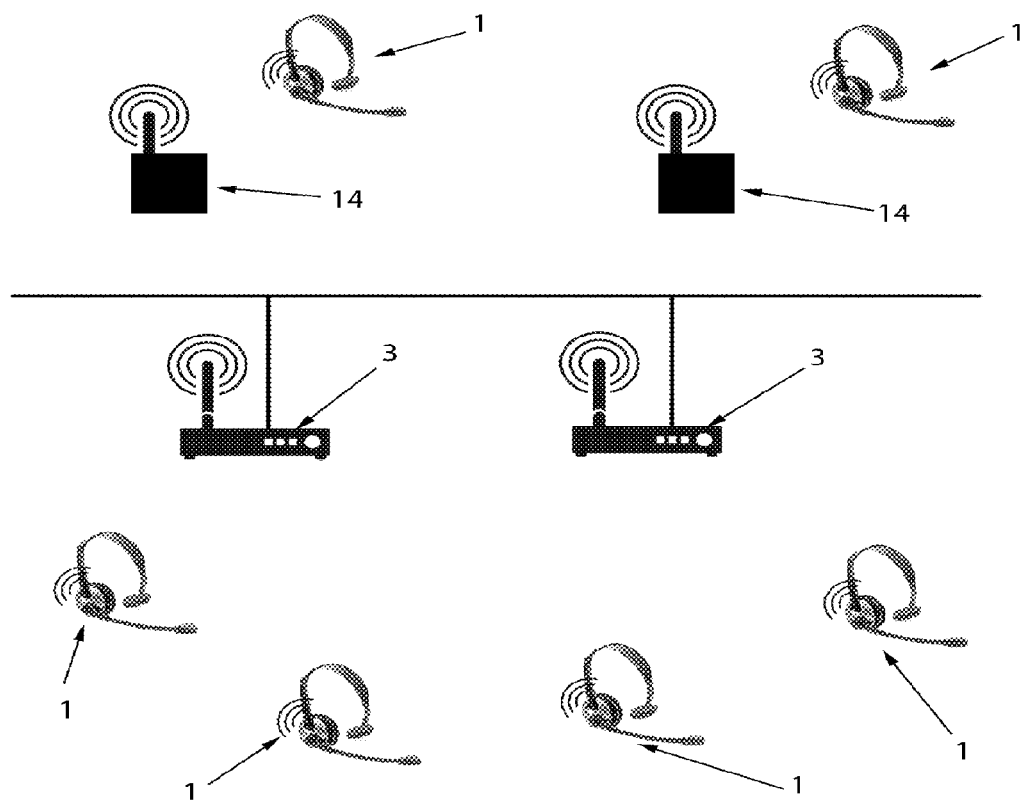
FIG. 3 is a schematic of a multi-cell system where headset transition seamlessly between communication access points and wireless repeaters.

Referring now to FIG. 3, multiple communication access points 3 are shown in a multi-cell environment. In preferred embodiments, the access point 3 is a scalable, DECT device capable of delivering voice and data to multiple users over extended distances. As shown in the image, all headsets 1 are in group conference mode. However, the headsets are connected to different communication access points 3 or wireless repeaters 14, depending on their physical location in the environment. As the headset 1 moves through the environment, it may disconnect from one communication access point 3 and reconnect to another communication access point 3 without losing the voice connection to other headset users. The multi-cell configuration enables the headset user to roam over large distances and seamlessly transition between communication access points 3 without losing the voice connection. In the preferred embodiment, multiple communication access points 3 may be connected to a wired Ethernet network to facilitate the seamless transition of headsets 1 between the communication access points 3. In another embodiment, wireless repeaters 14 are not connected to the Ethernet, but rather extend the wireless range of a given access point 3 as headsets 1 seamlessly transition between access point 3 and repeater 14. This innovative multi-cell configuration creates new opportunities for the wireless headset 1 to roam greater distances.

Figure 4:
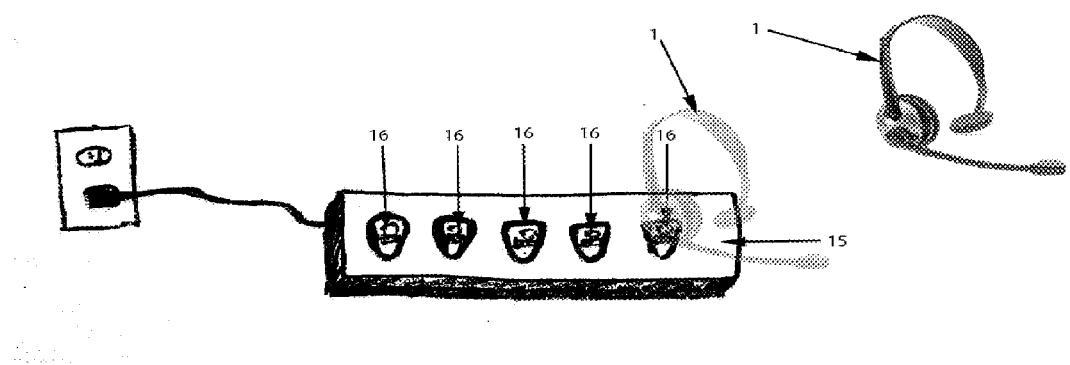
FIG. 4 is a schematic of a multi-headset charger for the purpose of charging multiple headsets simultaneously.

Referring now to FIG. 4, multiple wireless headsets can be charged simultaneously in a single charging system 15 which can be a standalone or wall mounted device. The headsets of the present invention are recharged on the charging system 15 fitted for the headset devices. The charging system 15 has multiple ports or connections 16 to which the headset devices 1 attach. This allows each associate in the retail store to return their headset to a port 16 on the charging system 15 for recharging, when not in use. When a headset is fully charged, a solid light will engage on the headset to indicate the headset is ready for use.

What is claimed is:

1. A communication system comprising:
    a. at least two mobile wireless headsets, wherein the at least two mobile wireless headsets have full duplex capabilities and;
    b. at least one communication access point, wherein the at least one communication access point facilitates communication between the at least two mobile wireless headsets to deliver communications between the at least two mobile wireless headsets without a server interfacing between the at least two mobile wireless headsets and the communication assess point for group conferencing;
        wherein the at least one communication access point is attached to at least one additional communication access point, and each communication access point being connected to the at least one mobile wireless headset to create a multi-cell configured network of multiple communication access points;
        wherein the communication access point is connected to a computer system network to allow separate transmission of communications between the computer system network and the at least two mobile wireless headsets;
        wherein the computer system network uses speech recognition software that enables voice commands received through the at least two mobile wireless headsets to be recorded as data inputs in the computer system network;
        wherein the computer system network uses text-to-speech software that enables the computer system networks to send data through the communication access point and the at least two mobile wireless headsets in the form of voice commands; and
        wherein each mobile wireless headset of the at least two mobile wireless headsets comprises speaking mode executable software to create an echo only in the each headset of a user who is speaking, wherein the echo indicates voice transmission from the each headset of the user who is speaking to other each headsets of the at least two mobile headsets.

2. The communication system of claim 1, wherein the at least two mobile wireless headsets have an activation and deactivation feature that is selected from a group consisting of a push to talk setting, a VOX communication setting, and a talk-lock setting.

3. The communication system of claim 1, wherein at least two mobile wireless headsets contains an indicator to signal that the mobile wireless headset is transmitting speech, with the indicator selected from the group consisting of an audio indicator and a visual indicator.

4. The communication system of claim 1, wherein the at least one mobile wireless headset has a charging contact that connects to a headset charging port of a charging device to replenish a battery of the at least one mobile wireless headset.

5. The communication system of claim 1,
    wherein each mobile wireless headset of the at least two mobile wireless headsets include Digital Enhanced Cordless Telecommunications (DECT) protocol; and
    wherein the at least one communication access point includes Digital Enhanced Cordless Telecommunications (DECT) protocol.

6. A communication system comprising:
    at least two mobile wireless headsets, and
    a communication access point configured to deliver communications between the at least two mobile wireless headsets through a speech recognition command and without a server interfacing between the at least two mobile wireless headsets and the communication access point for group conferencing, and
    wherein the communication access point is connected to a computer system network to allow separate transmission of communications between the computer system network and the at least two mobile wireless headsets;
    wherein each mobile wireless headset of the at least two mobile wireless headsets includes full duplex capabilities;
    wherein the computer system network uses speech recognition software that enables voice commands received through the at least two mobile wireless headsets to be recorded as data inputs in the computer system network;
    wherein the computer system network uses text-to-speech software that enables the computer system networks to send data through the communication access point and the at least two mobile wireless headsets in the form of voice commands; and
    wherein each mobile wireless headset of the at least two mobile wireless headsets comprises speaking mode executable software to create an echo only in the each headset of a user who is speaking, wherein the echo indicates voice transmission from the each headset of the user who is speaking to other each headsets of the at least two mobile headsets.

7. The communication system of claim 6, wherein the communication access point is a stand-alone device.

8. The communication system of claim 6, wherein the server is connected to the communication access point through an Ethernet connection.

9. The communication system of claim 6, wherein the computer system network is connected to at least one computer based telephone to provide voice communication between the at least two mobile wireless headsets and group teleconferencing between the at least one computer based telephone and the at least two mobile wireless headsets.

10. The communication system of claim 9, wherein the at least one computer based phone is a VoIP telephone.

11. The communication system of claim 9, wherein the at least one computer based phone is a software telephone.

12. The communication system of claim 6, wherein each mobile wireless headset of the at least two mobile wireless headsets is turned on and off through the use of an activation and deactivation feature that is selected from a group consisting of a push to talk setting, a VOX communication setting, and a talk-lock setting.

13. The communication system of claim 12, wherein the each mobile wireless headset of the at least two mobile wireless headsets contains an indicator to signal to a mobile wireless headset user that the at each mobile wireless headset is activated, with the indicator selected from the group consisting of an audio indicator and a visual indicator.

14. The communication system of claim 6, wherein each mobile wireless headset of the at least two mobile wireless headsets contains a wireless security device to protect communications between the communication access point and the at least two mobile wireless headsets.

15. The communication system of claim 6, wherein each mobile wireless headset of the at least two mobile wireless headsets has a charging contact that connects to a headset charging port of a power strip of a charging device to replenish a battery of the each mobile wireless headset of the at least two mobile wireless headsets.

16. The communication system of claim 6, further comprising the at least two mobile wireless headsets including Digital Enhanced Cordless Telecommunications (DECT) protocol.

17. A communication system comprising:
at least three mobile wireless headsets,
a server; and
a communication access point in communication with the server, wherein the communication access point is configured to deliver communications between the at least three mobile wireless headsets for group conferencing of all mobile wireless headsets of the at least three mobile wireless headsets to form a group conference, and for facilitating private calling between two mobile wireless headsets of the at least three mobile wireless headsets in the group conference;
wherein each mobile wireless headset of the at least three mobile wireless headsets includes full duplex capabilities;
wherein the communication access point includes private calling executable software activated by a speech recognition command to isolate communications between the two mobile wireless headsets of the at least three mobile wireless headsets engaged in the group conference;
whereby other mobile wireless headsets of the at least three mobile wireless headsets in the group conference do not hear a private call between the two mobile wireless headsets of the at least three mobile wireless headsets in the group conference;
wherein the computer system network uses speech recognition software that enables voice commands received through the at least two mobile wireless headsets to be recorded as data inputs in the computer system network; and
wherein the computer system network uses text-to-speech software that enables the computer system networks to send data through the communication access point and the at least two mobile wireless headsets in the form of voice commands.

18. The communication system according to claim 17, further comprising the server being connected to a computer system network to allow transmission of communications between the computer system network and each headset of the at least three mobile wireless headsets; wherein the communication access point is configured to deliver communications between the server and the at least three mobile wireless headsets.

19. The communication system of claim 18, wherein the computer system network is connected to at least one computer based telephone to provide voice communication between two mobile wireless headsets of the at least three mobile wireless headsets and group teleconferencing between the at least one computer based telephones and the two mobile wireless headsets.

20. The communication system of claim 19, wherein the at least one computer based phone is a VoIP telephone.

21. The communication system of claim 19, wherein the at least one computer based phone is a software telephone.

22. The communication system according to claim 17, wherein each mobile wireless headset of the at least three mobile wireless headsets comprises speaking mode executable software to create an echo only in the each mobile wireless headset of a user who is speaking, wherein the echo indicates voice transmission from the each mobile wireless headset of the user who is speaking to other each mobile wireless headsets of the at least three mobile wireless headsets.

\* \* \* \* \*